(12) United States Patent
Rathke et al.

(10) Patent No.: US 7,694,776 B2
(45) Date of Patent: Apr. 13, 2010

(54) HYDRAULIC STEERING SYSTEM WITH PROTECTION AGAINST UNCONTROLLED STEERING MOVEMENTS

(75) Inventors: Rolf-Joachim Rathke, Kiel (DE); Erhard Bergmann, Mirow (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 531 days.

(21) Appl. No.: 11/630,624

(22) PCT Filed: Jun. 28, 2005

(86) PCT No.: PCT/EP2005/006952

§ 371 (c)(1),
(2), (4) Date: Feb. 12, 2007

(87) PCT Pub. No.: WO2006/002872

PCT Pub. Date: Jan. 12, 2006

(65) Prior Publication Data

US 2008/0142291 A1 Jun. 19, 2008

(30) Foreign Application Priority Data

Jun. 30, 2004 (DE) .................. 10 2004 031 676
Dec. 23, 2004 (DE) .................. 10 2004 062 387

(51) Int. Cl.
*B62D 5/08* (2006.01)
(52) U.S. Cl. .................................... 180/406
(58) Field of Classification Search ............... 180/406
See application file for complete search history.

(56) References Cited

U.S. PATENT DOCUMENTS

| 5,862,878 | A  | * | 1/1999 | Bohner et al. | 180/403 |
| 6,102,150 | A  | * | 8/2000 | Bohner et al. | 180/403 |
| 6,209,677 | B1 | * | 4/2001 | Bohner et al. | 180/406 |
| 6,386,312 | B1 | * | 5/2002 | Sevelsted | 180/417 |
| 6,581,717 | B1 | * | 6/2003 | Sørensen et al. | 180/401 |
| 6,595,314 | B2 | * | 7/2003 | Juul et al. | 180/419 |
| 6,612,393 | B2 | * | 9/2003 | Bohner et al. | 180/405 |

FOREIGN PATENT DOCUMENTS

| DE | 35 15 124 A1 | 10/1986 |
| DE | 38 37 395 A1 | 5/1989 |
| DE | 40 31 969 A1 | 4/1992 |

* cited by examiner

*Primary Examiner*—Tony H. Winner
(74) *Attorney, Agent, or Firm*—Scully, Scott, Murphy & Presser, P.C.

(57) ABSTRACT

A hydraulic steering system (1) including a hydraulic steering unit (2) and an auxiliary device (3). Said The steering unit (2) feeds a hydraulic medium to a steering cylinder (5) according to the movement of a steering wheel (4). The auxiliary device (3) includes a valve unit (6) and also feeds a hydraulic medium to the steering cylinder (5) according to the movement of the steering wheel (4), in order to assist the steering movement. The hydraulic medium ejected or discharged from the steering cylinder (5) as a result of the hydraulic medium fed thereinto flows back into a tank (10) or to a pump (8, 9) through the steering unit (2).

5 Claims, 4 Drawing Sheets

HYDRAULIC STEERING SYSTEM WITH PROTECTION AGAINST UNCONTROLLED STEERING MOVEMENTS

BACKGROUND OF THE INVENTION

The invention relates to a hydraulic steering system having a hydraulic steering unit and a power assist device. The hydraulic steering system is used, for example, in mobile machines in the construction and agricultural sector, but also in floor conveyor vehicles for example.

DISCUSSION OF THE PRIOR ART

For example, DE 38 37 395 A1 describes a hydrostatic power-assisted steering system for vehicles which has a power assist device. The power assist device, which is arranged very indirectly and mostly far away from the steering means, is subject to numerous fault influences. The hydraulic steering system with power assist device, also referred to as a hydrostatic power-assisted steering system, is not protected against malfunctions of the power assist device.

It is a disadvantage of the hydraulic steering system described by DE 38 37 395 A1 that malfunctioning of the power assist device can result in a steering behaviour which is not controllable by the driver.

SUMMARY OF THE INVENTION

It is therefore the object of the invention to provide a hydraulic steering system having an assist device which allows the vehicle to be controllably steered even in the event of malfunctioning of the assist device.

The object is achieved according to the invention by a hydraulic steering system with assist device having the features of claim 1.

The measures set out in the subclaims relate to advantageous developments of the hydraulic steering-system according to the invention.

In particular, it is advantageous if the hydraulic medium flowing off from the steering cylinder is prevented from flowing back via the assist device or the valve unit by at least one blocking device, for example in the form of nonreturn valves, which permits the flow of hydraulic medium only in one direction.

It is additionally advantageous to configure the valve unit of the assist device as a proportional valve. The servo control can thereby take place even more precisely.

Furthermore, it is advantageous to regulate or control the servo control by an electronic control device in dependence on at least the steering movement. In particular, the servo control can thereby be made easily influenceable by further command variables, for example the vehicle speed.

BRIEF DESCRIPTION OF THE DRAWINGS

The invention is explained in more detail below, by way of example, using an exemplary embodiment with reference to a schematic illustration. Corresponding components are provided here with corresponding reference symbols.

DETAILED DESCRIPTION OF THE INVENTION

Figure 1:
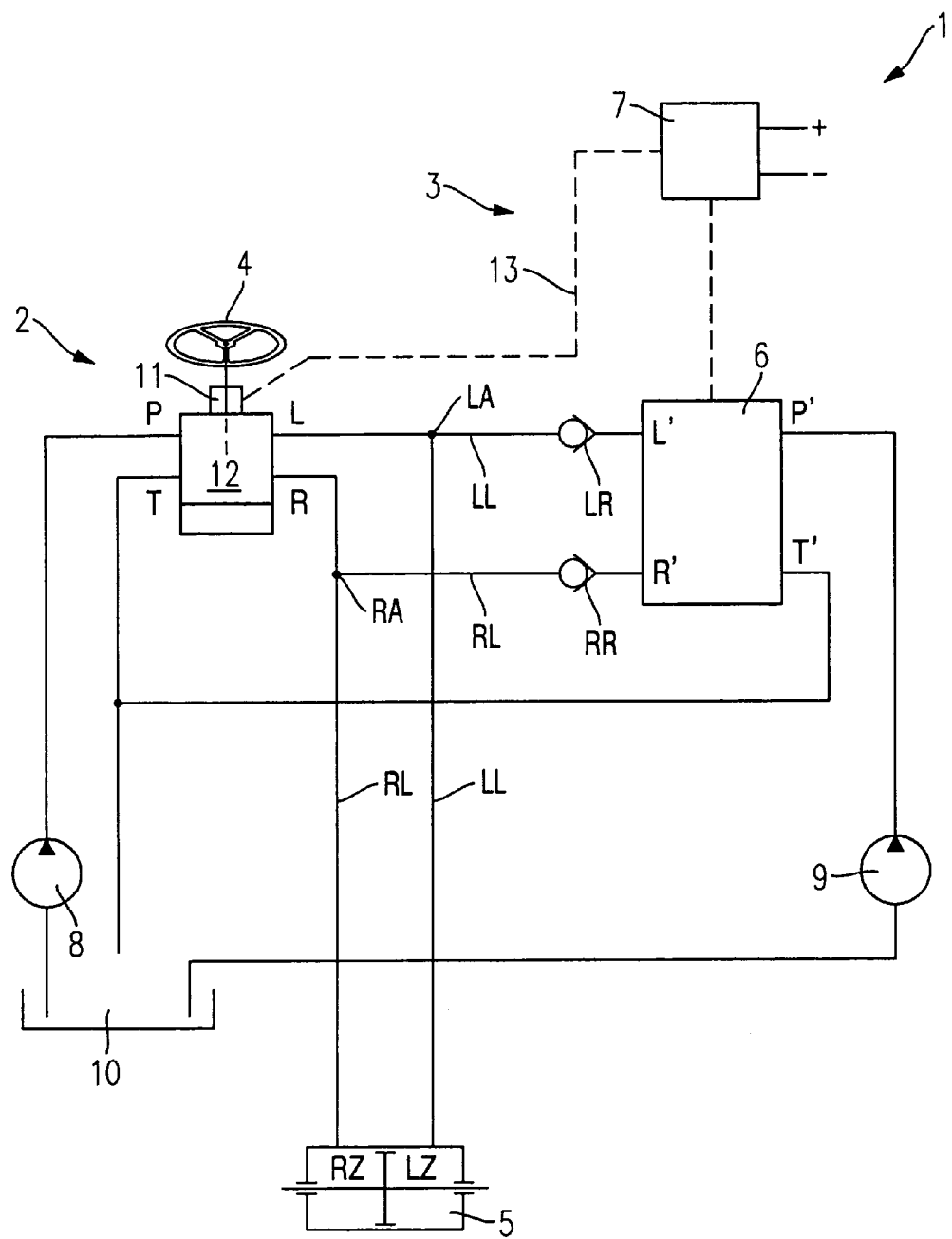
FIG. 1 shows a schematic illustration of a hydraulic steering system according to the invention.

The hydraulic steering system illustrated in FIG. 1 and denoted by the reference symbol 1 consists essentially of a steering unit 2, an assist device 3, a steering cylinder 5 and of a right line RL and a left line LL, which hydraulically connect the steering unit 2, the assist device 3 and the steering cylinder 5.

In the exemplary embodiment illustrated, the steering unit 2 comprises a steering means 4 embodied as a steering wheel, and a valve block 12. Arranged on the steering means 4 is a sensor 11 which transmits data on, for example, the position of the steering means 4 via an electrical line 13 to a control device 7 of the assist device 3. In the exemplary embodiment, the steering unit 2 or the valve block 12 is fed in a pressurised manner with hydraulic medium from a tank 10 and a first pump 8, embodied for example as a gear pump, via a supply connection P of the valve block 12. The valve block 12 additionally has a left connection L and a right connection R. The pressure prevailing at the supply connection P is transmitted via valves (not illustrated) in the valve block 12 either to the left connection L or the right connection R depending on the movement of the steering means 4, whereby an amount of hydraulic medium typically in proportional relationship to the degree of turning of the steering means emerges from the left connection L or the right connection R.

The control device 7 controls or regulates a valve unit 6 of the assist device 3 in dependence at least on the movement of the steering means 4. The valve unit 6 is likewise fed in a pressurised manner with hydraulic medium from the tank 10 via a second pump 9 and via a supply connection P'. The valve unit 6, configured as a proportional valve, introduces an amount of hydraulic medium corresponding to the control commands of the control device 7 into the left line LL via a left connection L' and into the right line RL via a right connection R' and/or builds up a corresponding pressure. The left line LL leads from the left connection L' of the valve unit 6 to the left connection L of the steering unit 2. The right line RL leads from the right connection R' of the valve unit 6 to the right connection R of the steering unit 2.

The right line RL has a right junction RA which is connected to a right steering-cylinder chamber RZ of the steering cylinder 5. The left line LL has a left junction LA which is connected to a left steering-cylinder chamber LZ of the steering cylinder 5. Accordingly, hydraulically the right connections R' and R are connected in parallel and the left connections L and L' are connected in parallel, it being the case that, for example, the left connections L and L' in other exemplary embodiments (not illustrated) can each be connected via separate hydraulic lines to the left steering-cylinder chamber LZ and then are in permanent connection via the latter. The valve unit 6 is in connection with the tank 10 via a discharge connection T'. The steering unit 2 is in connection with the tank 10 via a discharge connection T of the steering unit 2.

If, for example, the steering means 4 is turned to the right, the right line RL is fed from the right connection R of the steering unit 2 with an amount of hydraulic medium depending on the extent of the turning movement of the steering means 4. In order, for example, to assist the steering action or ensure a steering action even in the event of a failure of the functioning of the valve block 12, the control device 7 induces, owing to the movement of the steering means 4 transmitted by the sensor 11, the valve unit 6 to feed hydraulic medium from the right connection R' of the valve unit 6 into the right line RL.

Owing to the amount of hydraulic medium fed into the right line RL by the valve block 12 and the assist device 3, the right steering-cylinder chamber RZ in the steering cylinder 5 increases, while the left steering-cylinder chamber LZ, opposite the right steering-cylinder chamber RZ, decreases as a result of the increase of the right steering-cylinder chamber RZ. As a result of the decrease of the left steering-cylinder chamber LZ, a corresponding part of the amount of hydraulic medium situated therein is displaced into the left line LL. Accordingly, if the steering means 4 is turned to the left, hydraulic medium flows out of the right steering-cylinder chamber RZ into the right line RL.

Arranged between the left junction LA and the left connection L' of the valve unit 6 is a first blocking device, configured in this exemplary embodiment as a left nonreturn valve LR, which prevents hydraulic medium from being able to flow off via the valve unit 6 from the steering cylinder 5 or the left steering-cylinder chamber LZ and the left line LL, or from the system comprising steering cylinder 5 and left line LL.

Arranged between the right junction RA and the right connection R' of the valve unit 6 is a second blocking device, configured as a right nonreturn valve RR, which prevents hydraulic medium from being able to flow off via the valve unit 6 from the steering cylinder 5 or the right steering-cylinder chamber RZ and the right line RL, or from the system comprising steering cylinder 5 and right line RL.

In the exemplary embodiment shown, the whole amount of hydraulic medium returned from the steering cylinder 5 is thus always returned via the steering unit 2 and not via the power assist device 3 or the valve unit 6. The device which prevents the hydraulic medium from flowing back or permits it only in one direction, namely out of the system of steering cylinder 5 and lines RL and LL, may in other exemplary embodiments also be arranged, for example, in the valve unit 6 or formed by appropriately modified control pistons of the valve unit 6.

In the event of a malfunction of the assist device 3 or the valve unit 6, the valve unit 6 may suddenly attempt to convey hydraulic medium through the left connection L' into the left line LL or through the right connection R' into the right line RL. Without the features according to the invention of the hydraulic steering system 1, in the exemplary embodiment the hydraulic medium displaced from the steering cylinder 5 could flow off via the respective other connection L' or R' of the valve unit 6, resulting in unintentional or surprisingly severe and sudden steering movements of the vehicle, since countersteering by the driver can then only take place with a delay.

If the steering means 4 is in neutral position for example, an incorrect attempt by the assist device 3 to meter hydraulic medium through the left connection L' of the valve unit 6 into the left line LL does not result in hydraulic medium flowing off from the right steering-cylinder chamber RZ, on the one hand since the hydraulic fluid cannot flow off from the right steering-cylinder chamber RZ via the right connection R of the steering unit 5 since this connection is closed by the neutral position of the steering means 4, and on the other hand because the flowing-off of hydraulic medium via the right connection R' of the valve unit 6 is prevented by the right nonreturn valve RR. There is thus no steering movement of the vehicle. The same applies analogously if the steering means 4 is in neutral position and there is an incorrect attempt by the power assist device 3 to meter hydraulic medium through the right connection R' of the valve unit 6 into the right line RL. A neutral position in this context is also to be regarded as being outside the central position of the steering means, provided that the steering means remains in this position, i.e. does not perform a turning movement.

In the case of a hydraulic steering system 1 without the features according to the invention, the hydraulic medium flowing off from the right steering-cylinder chamber RZ would flow off via the right connection R' of the incorrectly functioning or incorrectly controlled valve unit 6 and an unintentional steering movement would result.

If the steering means 4 in the exemplary embodiment shown is turned to the right for example, an incorrect attempt by the power assist device 3 to meter hydraulic medium through the left connection L' of the valve unit 6 into the left line LL results in the amount of hydraulic medium fed from the valve unit 6 flowing off through the left connection L, simultaneously opened by the right position, of the steering unit 2. The left connection L' is as it were connected in an unpressurised manner to the tank 10 via the steering unit 2. This produces only a very slight pressure effect of the hydraulic medium, fed through the left connection L', on the steering cylinder 5. The steering action of the steering system 1 in the right direction as a result of the right position of the steering means 4 survives, in weakened form, since the hydraulic medium metered from the right connection R of the steering unit 2 cannot flow off via the right connection R', which is blocked by the right nonreturn valve RR, of the valve unit 6 and thus hydraulic medium is caused to flow off from the left steering-cylinder chamber LZ via the opened left connection L of the steering unit 2. The same applies analogously if the steering means 4 is turned to the left and there is an incorrect attempt by the assist device 3 to meter hydraulic medium through the right connection R' of the valve unit 6 into the right line RL.

In the case of a hydraulic steering system 1 without the features according to the invention, turning the steering means 4 to the right and an incorrect attempt by the assist device 3 to meter hydraulic medium through the left connection L' of the valve unit 6 into the left line LL would result in the amount of hydraulic medium fed in by the right connection R of the steering unit 2 flowing off via the parallel-connected right connection R' of the valve unit 6, without a appreciable pressure being exerted on the right steering-cylinder chamber RZ. Neither of the hydraulic flows would thus exert any pressure and there would be no steering action of the steering system 1. However, since the greater oil flow is often available to the power assist device 3, a steering action directed opposite to the steering movement of the steering means 4 may result.

If the steering means 4 in the exemplary embodiment shown performs only a slight turn to the right for example, an incorrect attempt by the assist device 3 to meter hydraulic medium at the greatest pressure or in a maximum amount through the right connection R' of the valve unit 6 into the right line RL results in an increased counterpressure in the left steering-cylinder chamber LZ, since the hydraulic medium can flow off only via the left connection L of the steering unit 2 owing to the left nonreturn valve LR blocking the flow-off. The movements of the steering cylinder 5 are thereby less unexpectedly rapid and remain controllable.

The same applies analogously if the steering means 4 is turned slightly to the left and there is an incorrect attempt by the power assist device 3 to meter hydraulic medium at the greatest pressure or in a maximum amount through the left connection L' of the valve unit 6 into the left line LL.

Figure 2:
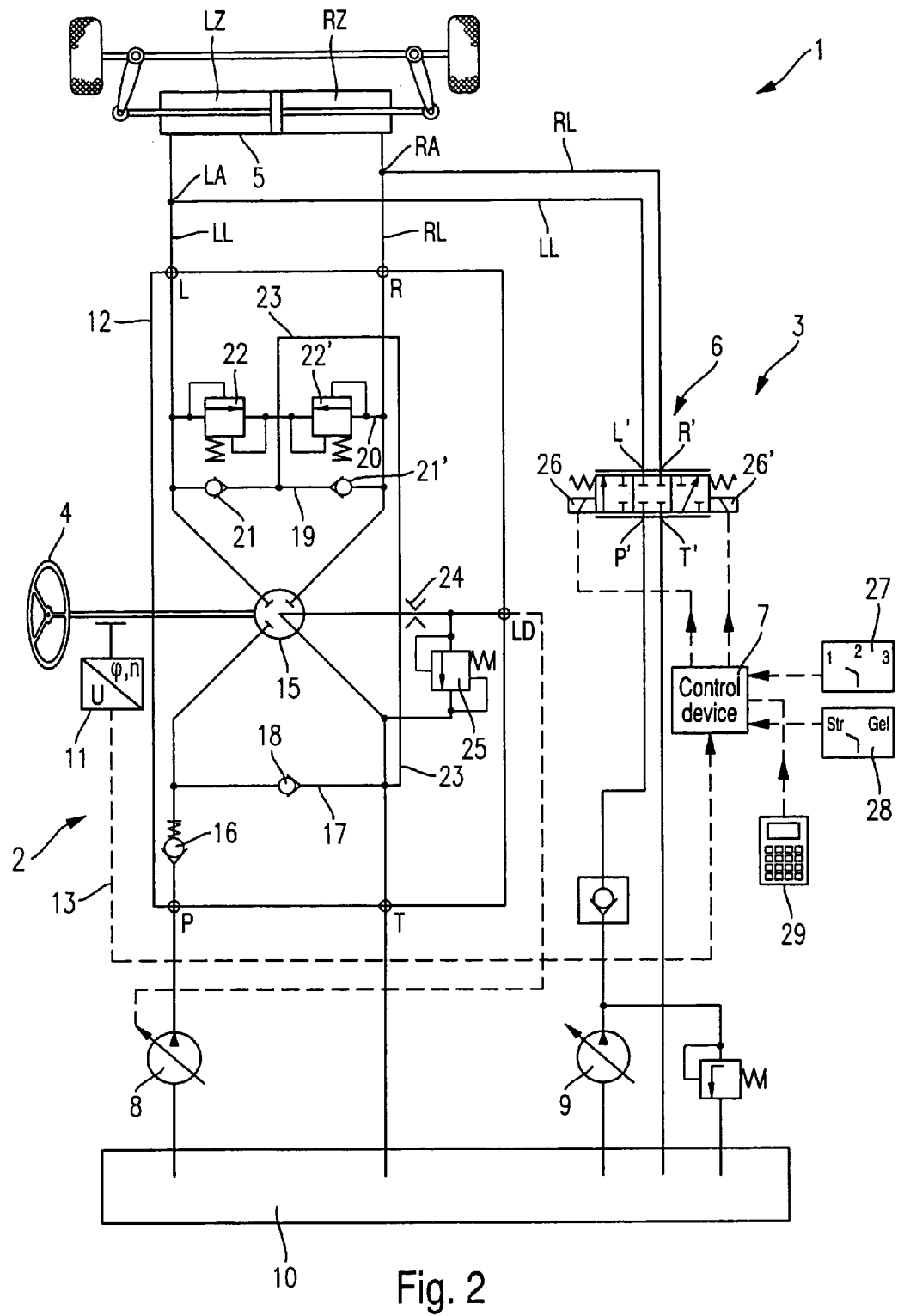
FIG. 2 shows a more detailed schematic illustration of a first exemplary embodiment of the hydraulic steering system according to the invention.

FIG. 2 shows an exemplary embodiment of the hydraulic steering system according to the invention, in which the valve block 12 and the valve unit 6 are illustrated in a detailed hydraulic circuit. To avoid unnecessary repetition, reference symbols corresponding to FIG. 1 are also used in FIG. 2, repeated description being dispensed with.

In the valve block 12 there is provided a steering valve 15 which cooperates with the steering means 4. In dependence on a turning movement of the steering means 4, steering valve 15 connects a supply connection P to the left connection L during a turning movement to the left and to the right connection R during a turning movement to the right. Simultaneously, the respective other connection is connected to the tank connection T via the steering valve 15. Arranged between the supply connection P and the steering valve 15 is a spring-loaded nonreturn valve 16 which is arranged in the direction of the steering valve 15. In the further course of the connection between the supply connection P and the steering valve 15 there is formed a first connecting duct 17 which connects the supply connection P to the tank connection T. Arranged in this first connecting duct 17 is a second nonreturn valve 18 which opens in the direction of the supply connection P.

Within the valve block 12, additionally the left connection L and the right connection R are connected to one another via a second connecting duct 19 and a third connecting duct 20. A third nonreturn valve 21 and a fourth nonreturn valve 21' are arranged in the second connecting duct 19, the third nonreturn valve 21 opening in the direction of the left connection L and the fourth nonreturn valve 21' opening in the direction of the right connection R.

A first differential pressure limiting valve 22 and a second differential pressure limiting valve 22' are arranged in the third connecting duct 20. The two differential pressure limiting valves 22 and 22' are each spring-loaded. Bypassing the steering valve 15, the tank connection is furthermore connected to the third connecting duct 20 via a bypass line 23, the bypass duct 23 opening out at a point of the third connecting duct 20 which opens out between the first and second differential pressure limiting valves 22 and 22', respectively. In the further course, the bypass duct 23 connects the third connecting duct 20 to the second connecting duct 19, the connecting point between the bypass duct 23 and the second connecting duct 19 again opening out between the third and fourth nonreturn valves 21, 21'.

If, for example, the pressure in the left line LL increases, the first differential pressure limiting valve 22 opens from a specific differential pressure set by the spring of the first differential pressure limiting valve 22. To this end, the differential pressure limiting valve 22 is subjected to the pressure prevailing in the left line LL, on the one hand against the force of the spring. In the opposite direction and with an equal action to the spring, the first differential pressure limiting valve 22 is subjected to the pressure prevailing in the third connecting duct 20. As soon as the first differential pressure limiting valve 22 opens, pressure medium is carried off from the left line LL in the direction of the bypass line 23 via the first differential pressure limiting valve 22. The carried-off pressure medium flows on via the bypass line 23 on the one hand via the second connecting duct 19 and the thereupon opening fourth nonreturn valve 21' in the direction of the right connection. In addition, the pressure medium carried off from the left line LL is fed via the bypass line 23 to the tank connection T and discharged into the tank 10. An equalisation of the pressure prevailing in the left line LL and the right line RL therefore takes place via the first differential pressure limiting valve 22 and the fourth nonreturn valve 21', provided that the steering means 4 is not turned during the described pressure increase in the left line LL and hence the steering valve 15 is in a position in which connections are disconnected from one another.

Through the pressure equalisation in the left line LL and the right line RL, an equalisation of the pressure is also achieved in the left cylinder chamber LZ and the right cylinder chamber RZ. Through the equalisation of this pressure, the forces acting on the steering system cancel each other out, so that there is no unintentional steering movement. If, owing to a turning movement of the steering means 4, either the left connection L or the right connection R is connected to the tank connection T via the steering valve 15, part of the volume flow carried off via this connection is removed and carried off via a throttle 24. Downstream of the throttle 24 a control pressure connection LD is formed on the valve block 12. The delivery rate of the first pump 8, which is of adjustable design in FIG. 2, is adjusted via the control pressure present at the control pressure connection LD. To avoid the occurrence of excessive control pressures, a line branch in which a third differential pressure limiting valve 25 is arranged is provided between the throttle 24 and the control pressure connection LD. By means of the third differential pressure limiting valve 25, the control pressure connection LD is relieved in the direction of the tank connection T upon the occurrence of a differential pressure exceeding a specific, adjustable value.

The valve unit 6 is embodied in the figure as a 4/3-way valve. In the rest position of the valve unit 6 as illustrated in FIG. 2, the supply, tank, left and right connections P', T', L' and R' are disconnected from one another. Without driving by the control device 7, the valve unit 6 is kept in this rest position by two springs acting in opposite directions on the valve unit 6. A first electromagnet 26 or a second electromagnet 26' can be supplied with a signal via the control device 7. The first electromagnet 26 subjects the valve unit 6 to a force in the direction of a first end position of the valve unit 6. In this first end position of the valve unit 6, the supply connection P' is connected to the left connection L' of the valve unit 6, so that pressure medium is fed into the left line LL via the second pump 9.

If, in contrast, the second electromagnet 26' is supplied with a control signal by the control device 7, the electromagnet 26' moves the valve unit 6 in the direction of its second end position, in which the supply connection P' is connected to the right connection R'. In the second end position of the valve unit 6, pressure medium is thus drawn from the tank 10 by the second pump 9 and delivered into the right line RL. The right line R' or left line LL respectively not connected to the supply connection P' remains closed, so that pressure medium cannot be discharged via the valve unit 6. The blocking device which prevents the hydraulic medium from flowing back, is thus directly integrated in the valve unit 6. To protect the hydraulic system, a further nonreturn valve is formed in the connection between the second pump 9 and the supply connection P' of the valve unit 6.

As already stated in relation to FIG. 1, the control signals which are sent to the first electromagnet 26 or the second electromagnet 26' are determined by the control device 7 in dependence on a number of parameters. To this end, for example, a voltage is supplied to the control device by the sensor 11 via the electrical line 13. The output voltage of the sensor 11 depends here, for example, on the angle of rotation and a speed of rotation, which correspond to the turning movement of the steering means 4. The control signals output by the control device 7 can furthermore be influenced by a first selector switch 27 and a second selector switch 28. The change of the hydraulic intensification achieved by the assist device 3 can thus be varied to take account of specific operating situations. For example, the first or second selector switch 27, 28 can be used to effect a changed control response owing to a machine moving on or off the road. The steering angle resulting from a specific turning movement of the steering means 4 can thus be adapted, for example, to different driving speeds off or one the road.

Furthermore, the parameter sets of the control device 7 can be adapted via a service device 29.

Figure 3:
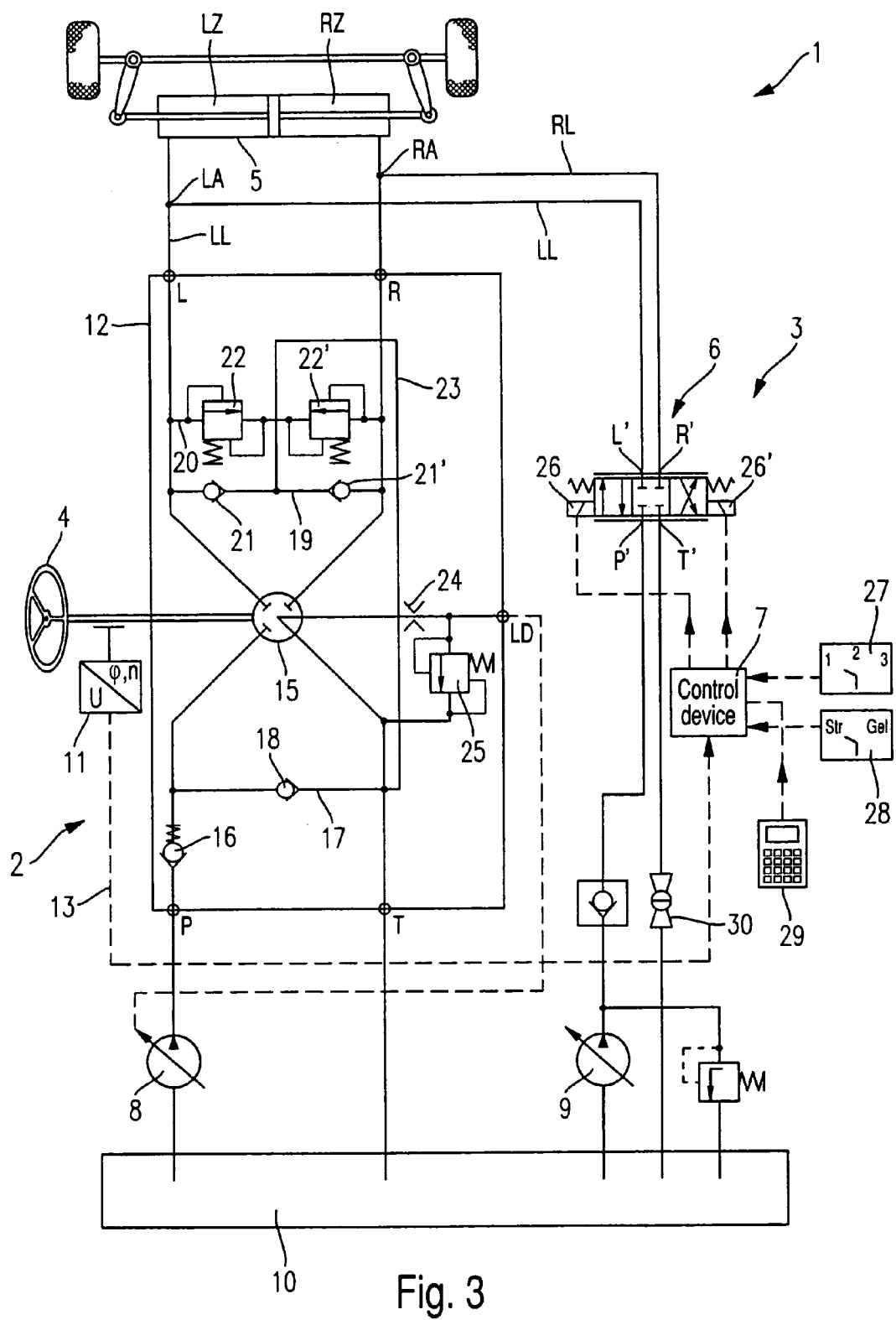
FIG. 3 shows a more detailed schematic illustration of a second exemplary embodiment of the hydraulic steering system according to the invention.
Figure 4:
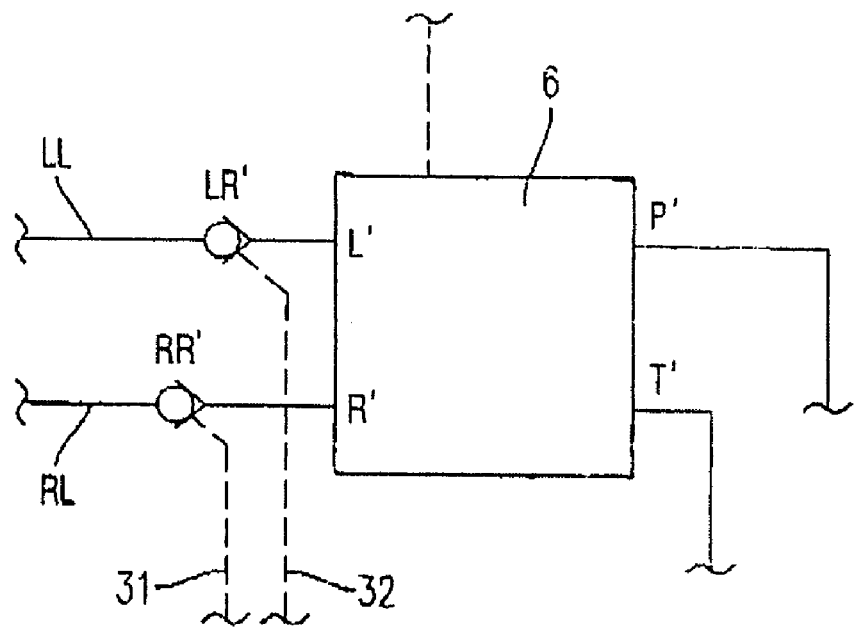
FIG. 4 shows a schematic illustration of a second unblockable assist device.

The second exemplary embodiment, illustrated in FIG. 3, of the hydraulic steering system according to the invention differs from the exemplary embodiment of FIG. 2 in that a modified valve unit 6' is used in the assist device 3. In contrast to the valve unit 6, in the first end position in the modified valve unit 6' not only the supply connection P' is connected to the left line LL, but additionally the right line RL is connected to the tank connection T'. If, in contrast, the modified valve unit 6' is deflected from its rest position illustrated in FIG. 3 in the direction of the second end position, on the one hand the supply connection P' is increasingly connected to the right line RL and on the other hand the left line LL is increasingly connected to the tank connection T'. This makes it possible for hydraulic medium to flow back via the modified valve unit 6', outside the rest position of the modified valve unit 6'. Downstream of the modified valve unit 6', a separate blocking device 30 is provided in the line leading to the tank 10 in order to prevent the hydraulic medium from flowing back.

In order to enable even better account to be taken of the particular operating situation, the separate blocking device 30 may also be of unblockable design. Accordingly, hydraulic medium can be returned to the tank 10 both via the steering valve 15 of the valve block 12 and via the valve unit 6' of the assist device 3, in dependence on the particular driving situation.

Unblockable blocking devices are, however, not only possible in the separate blocking device 30 as illustrated in FIG. 3.

Starting from, for example, the arrangement of the left nonreturn valve LR and the right nonreturn valve RR as shown in the first exemplary embodiment of FIG. 1, the backflow can take place via the valve unit 6 by unblocking the two nonreturn valves LR and RR. To this end, a modified design of the left nonreturn valve LR' and the right nonreturn valve RR' is used. The modified nonreturn valves LR' and RR' can be subjected, via a first unblocking line 31 and a second unblocking line 32 respectively, to a hydraulic pressure which moves the two nonreturn valves into their opened position irrespective of the pressure conditions in the left line LL or the right line RR. In this case, the two nonreturn valves LR' and RR' can be driven either jointly or independently of one another, the pressure set in the first unblocking line 31 and the second unblocking line 32 being settable independently of one another.

Figure 5:
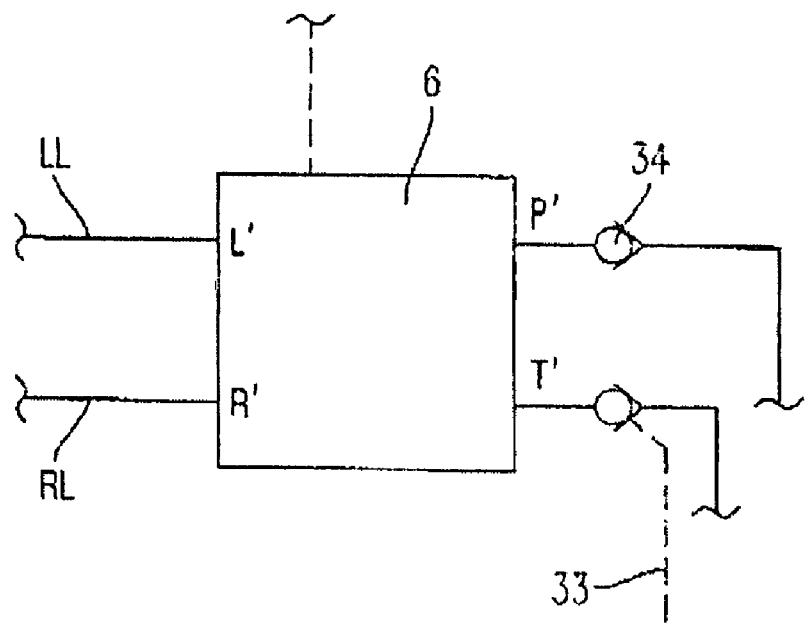
FIG. 5 shows a schematic illustration of a second exemplary embodiment of an unblockable assist device.

An alternative is illustrated in FIG. 5. Here, a nonreturn valve arranged between the tank connection T' of the valve unit 6 is likewise to be moved into its opened position via an unblocking line 33. It is thus possible for the left line LL or the right line RL to be respectively relieved in the direction of the tank 10 via the tank connection T', the assignment taking place via the valve unit 6. A nonreturn valve 34 is likewise formed on the supply side, upstream of the supply connection P'. This nonreturn valve 34 opens in the direction of the valve unit 6 and thus protects the second pump 9 from any impermissible pressure increase that may occur.

The invention is not restricted to the exemplary embodiment. The features of the exemplary embodiment may be combined with one another in any desired way.

The invention claimed is:

1. Hydraulic steering system having a hydraulic steering unit, comprising a steering means and a valve block and which feeds hydraulic medium to a steering cylinder depending on the movement of said steering means, and an assist device having a valve unit which coevally feeds hydraulic medium with the hydraulic steering unit to the steering cylinder depending on the movement of the steering means to assist the steering movement, wherein the hydraulic medium displaced or flowing off from the steering cylinder as a result of the hydraulic medium which is fed in can flow back into a tank or to a pump solely via the steering unit; and wherein the hydraulic medium flowing off from the steering cylinder is prevented by at least one selectively unblockable blocking device from flowing back via the assist device.

2. Hydraulic steering system according to claim 1, wherein the steering unit has a left connection and a right connection, the valve unit has a left connection and a right connection, the left connections are connected, in parallel, via at least one left line to a left steering-cylinder chamber of the steering cylinder and the right connections are connected, in parallel, via at least one right line to a right steering-cylinder chamber of the steering cylinder, for enabling said hydraulic medium only to flow out of the right connection and the left connection of the valve unit and prevented from flowing in.

3. Hydraulic steering system according to claim 2, wherein the at least one blocking device is respectively arranged in the right line and the left line in front of the right connection and the left connection of the valve unit.

4. Hydraulic steering system according to claim 1 wherein, the valve unit is a proportional valve.

5. Hydraulic steering system according to claim 1, wherein an electronic control device controls or regulates the assist device or the valve unit in dependence on at least the movement of the steering means.

* * * * *